United States Patent [19]
Haddad et al.

[11] Patent Number: 5,751,536
[45] Date of Patent: May 12, 1998

[54] METHOD AND APPARATUS FOR PROVIDING ISOLATION FROM HAZARDOUS VOLTAGE LEVELS IN A HYBRID INSTRUMENTATION SYSTEM

[75] Inventors: Michel G. Haddad; Alvin G. Becker, both of Austin, Tex.

[73] Assignee: National Instruments Corporation, Austin, Tex.

[21] Appl. No.: 609,942

[22] Filed: Feb. 29, 1996

[51] Int. Cl.$^6$ ............................................. H02J 1/00
[52] U.S. Cl. ............................ 361/191; 307/328; 307/38
[58] Field of Search ............................ 361/160, 166, 361/167, 171, 172, 189, 190, 191, 192, 193; 307/326, 328, 38–41, 80, 81; 324/140 R, 114–116, 122, 103 R, 72, 72.5

[56] References Cited

U.S. PATENT DOCUMENTS 5,336,989  8/1994  Hofer ............................... 324/115
5,598,041  1/1997  Willis ............................... 307/43

*Primary Examiner*—Fritz Fleming
*Attorney, Agent, or Firm*—Conley, Rose & Tayon; Jeffrey C. Hood; Gary R. Stamford

[57] ABSTRACT

An isolation system for allowing a single measurement circuit to measure both low and high voltage signals from separate low and high voltage buses, respectively, while maintaining substantial isolation protection for humans or animals potentially exposed to the low voltage bus. A central relay coupled to the measurement circuit selects between the low and high voltage buses and thus provide one level of isolation. Two mutually exclusive relays on either side of the central relay provide another level of isolation. Since the central and the two mutually exclusive relay are all rated at the basic insulation level, the low and high voltage buses are separated by at least two relay levels thereby meeting the double insulation or high voltage testing standard during normal operation. For additional protection, should one or more of the relays fail, dual spark gaps limit the maximum voltage to an intermediate voltage level. Clamp circuits further limit the voltage appearing on the low voltage bus to below the hazardous voltage level. The spark gaps protect the maximum voltage appearing across the clamp circuits and the clamp circuits further limit the maximum voltage across the low voltage bus. Furthermore, in-series fuses isolate the high voltage from the low voltage bus if the high voltage hazardous condition exists for a significant period of time. Thus, at least three levels of protection are provided.

42 Claims, 3 Drawing Sheets

METHOD AND APPARATUS FOR PROVIDING ISOLATION FROM HAZARDOUS VOLTAGE LEVELS IN A HYBRID INSTRUMENTATION SYSTEM

FIELD OF THE INVENTION

The present invention relates to instrumentation systems and, more particularly, to a protection circuit for providing isolation between low and high voltage buses within a single instrumentation system.

DESCRIPTION OF THE RELATED ART

Scientists and engineers often use instrumentation systems for data measurement and acquisition to perform a variety of functions, including laboratory research, process monitoring and control data logging, analytical chemistry tests and analysis of physical phenomena and control of electrical machinery to name a few examples. Generally a process being monitored or otherwise controlled, generally referred to as the unit under test (UUT), is interfaced to one or more I/O (input/output) devices. The I/O interface options include instrumentation associated with the GPIB (general purpose interface bus), is the VXI bus, the RS 232 protocol, SCXI (signal conditioning extensions for instrumentation) and corresponding SCXI bus, as well as other acquisition and conditioning systems as known to those skilled in the art.

SCXI is a high performance signal conditioning and instrumentation system for PC-based data acquisition and control. The PC (personal computer) generally comprises an IBM compatible, a Macintosh or similar type PC system, which includes an I/O bus and corresponding connectors or slots for receiving I/O boards. A data acquisition (DAQ) board is plugged into the I/O slot of the PC for communicating with signal conditioning modules plugged into a SCXI chassis for ultimately interfacing the UUT with the PC.

Alternatively, an SCXI DAQ module with a parallel port interface serves to acquire signals and transmit digital data to the parallel port of the PC. The PC may further include analysis hardware and software for analyzing and appropriately displaying the measured data. The signal conditioning modules interface with the I/O signals and transducers connected to the UUT to perform signal conditioning functions, such as amplification, multiplexing, isolation, filtering, sample and hold, transducer excitation and relay control, among other conditioning functions. The present invention is illustrated for an SCXI system, although the present invention is equally applicable to other instruments based on GPIB, VXI, etc.

Often, it is necessary to measure both low and high voltage signals of a UUT or system being monitored or controlled. For example, it may be desired to accurately measure power signals applied to a piece of equipment while simultaneously taking precise low voltage temperature measurements. However, if a low voltage signal is to be monitored or otherwise measured using a low voltage bus, the entire system typically becomes solely a low voltage system in order to meet the safety electrical isolation standards to keep the user away from hazardous voltage levels. In a hybrid system including both a low voltage bus and a bus carrying a high voltage signal, the low and high voltage buses must be sufficiently isolated from each other to avoid the possibility of accidental exposure. However, appropriate isolation between high and low voltage buses is extremely difficult to achieve in a cost-effective manner while still having the ability to switch between busses programmatically in the same instrument. Therefore, such hybrid systems are not attempted and are heretofore unknown.

An instrumentation system is considered non-hazardous and safe for human contact if it sufficiently isolates the user from voltages above about 30 Vrms and 42.4 V peak or 60 VDC. Voltages below this level will not generate enough current to cause fibrillation of the heart or severe burning which might otherwise harm or even kill a person. Voltages above 30 Vrms and 42.4 V peak or 60 VDC could potentially harm or even kill a person and thus are considered hazardous. Electrical isolation standards have been established for many kinds of equipment, where these standards depend on a plurality of factors including the scope, environment and intended use of the equipment. For purposes of the present disclosure, it is desired to accurately measure voltages up to 250 V rms using test and measurement equipment. One current applicable standard is IEC 1010-1 promulgated by the International Electrotechnical Commission (IEC). Similar or even identical standards include United Laboratories (UL) 3101 and 3111, European Norms (EN) 61010-1, Canadian Standards Association (CSA) 22.2 #1010-1 among other standards.

These standards specify certain tests and specifications that must be met to adequately shield persons from potentially hazardous voltages. For example, an installation category IV measurement circuit is intended for measuring parameters of overhead power lines which are subject to voltage spikes, such as lightning, which may have very high voltages. Therefore, the system must provide protection to the user from high voltage transients. The present invention concerns instrumentation rated at pollution degree 2, which means that the system is not hermetically sealed and is exposed to some level of contaminating particles from the environment. A double insulated instrumentation system according to pollution degree 2 for measuring power signals of 250 V rms and meeting installation category II standards requires a dielectric strength of 2300 Vrms for proper isolation.

A category II system for measuring 250 V rms must provide double insulation or two separate layers of protection between the high voltage and potential human contact. Basic insulation is a single layer of protection against electric shock. Double insulation may be achieved with a combination of basic insulation plus supplementary insulation, such as indirect bonding to ground if the ground path is through a high integrity component. A related standard is creepage and clearance distances, where a separation of at least 3.3 mm between conductors on a printed circuit board (PCB) generally meets double insulation and where 1.5 mm meets basic insulation. One way to test the system is "high potential" testing where a certain voltage is applied for a minimum period of time to determine whether the isolation barrier is sufficient. For example, if a voltage of 2300 Vrms is applied between low and high voltage conductors for one minute without breakdown of the double insulation, the isolation meets the safety standard.

It is difficult to achieve the electrical isolation standards described above for instrumentation systems. A hybrid system including a separate bus for low and high voltages has heretofore not been provided due to the difficulty of achieving double insulation or its equivalent between the low and high voltage buses. Safety relays are known for high voltage machinery having a voltage rating of 2300 V rms. However, these relays are physically very large in size and do not have the necessary instrumentation signal quality rating and thus are not acceptable for taking accurate measurements.

3

It is therefore desired to provide a hybrid instrumentation system with separate buses for low and high voltages meeting the required electrical isolation standards.

SUMMARY OF THE INVENTION

An isolation system according to the present invention enables a hybrid instrumentation system including both low and high voltage buses to meet all the electrical isolation and safety standards. The instrumentation system includes a measurement system for monitoring signals of both a high voltage bus as well as a low voltage bus, where the low-voltage bus is non-hazardous and safe for human or animal contact. Both polarities of the measurement system are switched between low and high voltage buses through the contacts of a central form-C relay meeting basic insulation requirements. In particular, the contact to contact voltage isolation rating of the central relay is 1350 V. A two-form-A relay is situated on either side of the first relay to connect the measurement system to either the low voltage bus or the high voltage bus. The contact to contact rating of each of the two-form-A relays is also 1350 V to achieve another basic insulation layer. The 2 two-form-A relays are mutually exclusive in operation, i.e., only one of the mutually-exclusive relays are activated at any given time so that either the low voltage bus or the high voltage bus is connected to the measurement system. In this manner, the relays meet the high potential test isolation standard since the low and high voltage buses are separated by at least two sets of relay contacts for a total rating of at least 2300 V. The separation between the coils and contacts of all relays meets the double insulation standard.

In the event any one of the relays fails, further protection circuitry is provided for establishing an indirect bonding to ground using dual spark gaps, clamping devices, and fuses adjacent the low voltage bus. In this manner, if any one of the relays fail, the electrical isolation standards are still met. Furthermore, if two or all three relays fail and a high voltage is accidentally applied on the low voltage side, the clamp circuit clamps the bus signals to a predetermined maximum level safe for human contact, which is preferably 20 volts or less in the preferred embodiment. If the applied high voltage rises above an intermediate voltage level, such as 70 volts in the preferred embodiment, both spark gaps fire to limit the voltage applied to the clamp circuit to the intermediate voltage level thereby limiting the power dissipation in the clamp circuit. In this manner, the low voltage bus is protected by the clamp circuit and the clamp circuit is further protected by the dual spark gaps. These spark gaps may not be needed in all embodiments of the invention.

Finally, the fuses are coupled in series so that if the high voltage is present for a certain predetermined minimum period of time, the fuses blow, thereby isolating the high voltage from the low voltage bus. Thus, the fuses establish at least a basic insulation gap if the high voltage is applied for a significant period of time. In any event, the low voltage bus is clamped to non-hazardous voltage levels. The fuses may not be needed in all embodiments of this invention.

It is appreciated that the present invention provides several protection levels between the low and high voltage buses, thereby meeting the applicable safety standards even in the event of relay failure. The relays are preferably standard instrument quality relays with basic insulation voltage rating which are relatively inexpensive. The clamping components are also relatively inexpensive, preferably comprising a relatively small resistor and a diode coupled to each of the bus signals. Two diodes are preferably provided for each bus signal to allow protection for both positive and negative polarity signals. Furthermore, the spark gap devices are standard and relatively easy to implement so that the entire protection system is a cost effective means to achieve a greater safety level than that established by the required standards.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
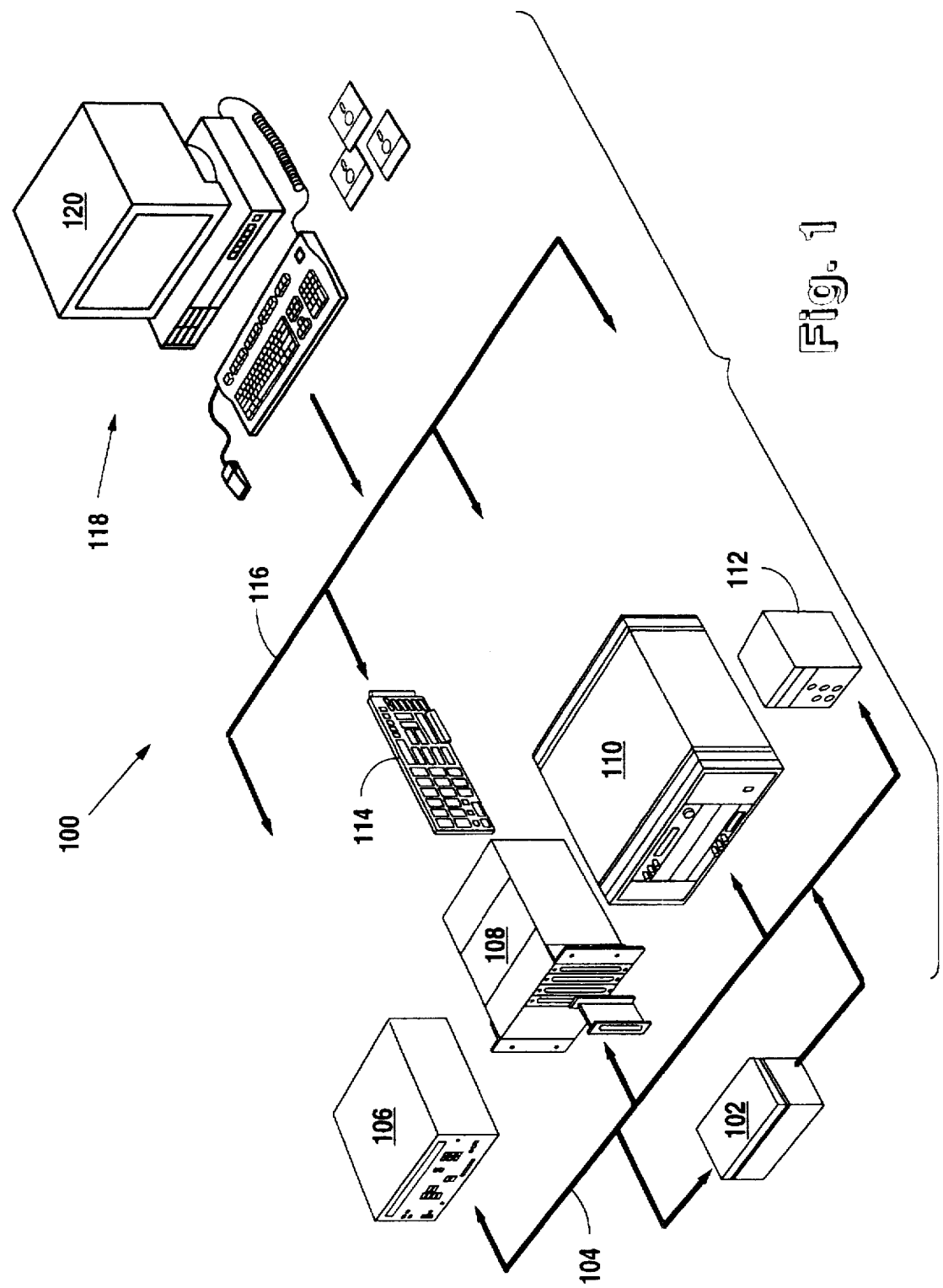
FIG. 1 is a perspective diagram of an instrumentation system according to the present invention.

Referring now to FIG. 1, a perspective diagram of an instrumentation system 100 is shown. A unit under test (UUT) 102 generally represents a process or other physical phenomena being monitored or controlled, including transducers or other sensing devices for detecting or measuring temperature, pressure, voltage, strain, etc. The UUT 102 is shown coupled to one or more instrumentation devices, such as a GPIB instrument 106, an SCXI chassis 108, a VXI chassis 110 or an RS 232 instrument 112 through cabling 104. The various instrument devices 106, 108, 110, 112 generally isolate field signals provided from the UUT 102 or otherwise amplify, reduce, filter or otherwise condition the field signals to provide corresponding digital signals either directly to a computer system 118 or through a plug-in DAQ board 114 plugged into an I/O slot of the computer system 118. Preferably, the DAQ board 114 is coupled to the interface bus 116 of the computer system 118. A typical instrumentation system might only include one of the instruments 106, 108, 110 or 112. The present invention is preferably comprised in the SCXI chassis 108 or in the VXI chassis 110.

The SCXI chassis 108 is a high performance signal conditioning and instrumentation system for PC-based data acquisition and control. The I/O signals and transducer connections from the UUT 102 are connected to one or more terminal blocks 130, which are shielded housings for direct connection of signal wires and strain relief clamps for maximum connection reliability. Each terminal block 130 connects directly to the front of one signal conditioning module 132, which is further plugged into a corresponding slot of an SCXI chassis 108. The cabling 104 carries signals from the UUT 102 to the signal conditioning modules 132. The respective signals can be applied directly to the front end of a module 132 or coupled through a terminal block 130 as desired. High voltage signals may also be coupled to the module 132 through an appropriate terminal block 130.

In general, each of the signal conditioning modules 132 are designed for performing one or more of several signal conditioning functions, such as amplification, multiplexing, isolation, filtering, sampling, transducer excitation, relay control, etc. The SCXI chassis 108 may be used as a front end signal conditioning system for the plug-in DAQ board 114, which includes a plurality of channels and appropriate circuitry for collecting data and providing the collected data to the interface bus 116 of the computer system 118. In an alternative embodiment, an SCXI data acquisition and control module is plugged into the SCXI chassis 108 for transmitting data directly to the computer system 118 through its parallel port.

Figure 2:
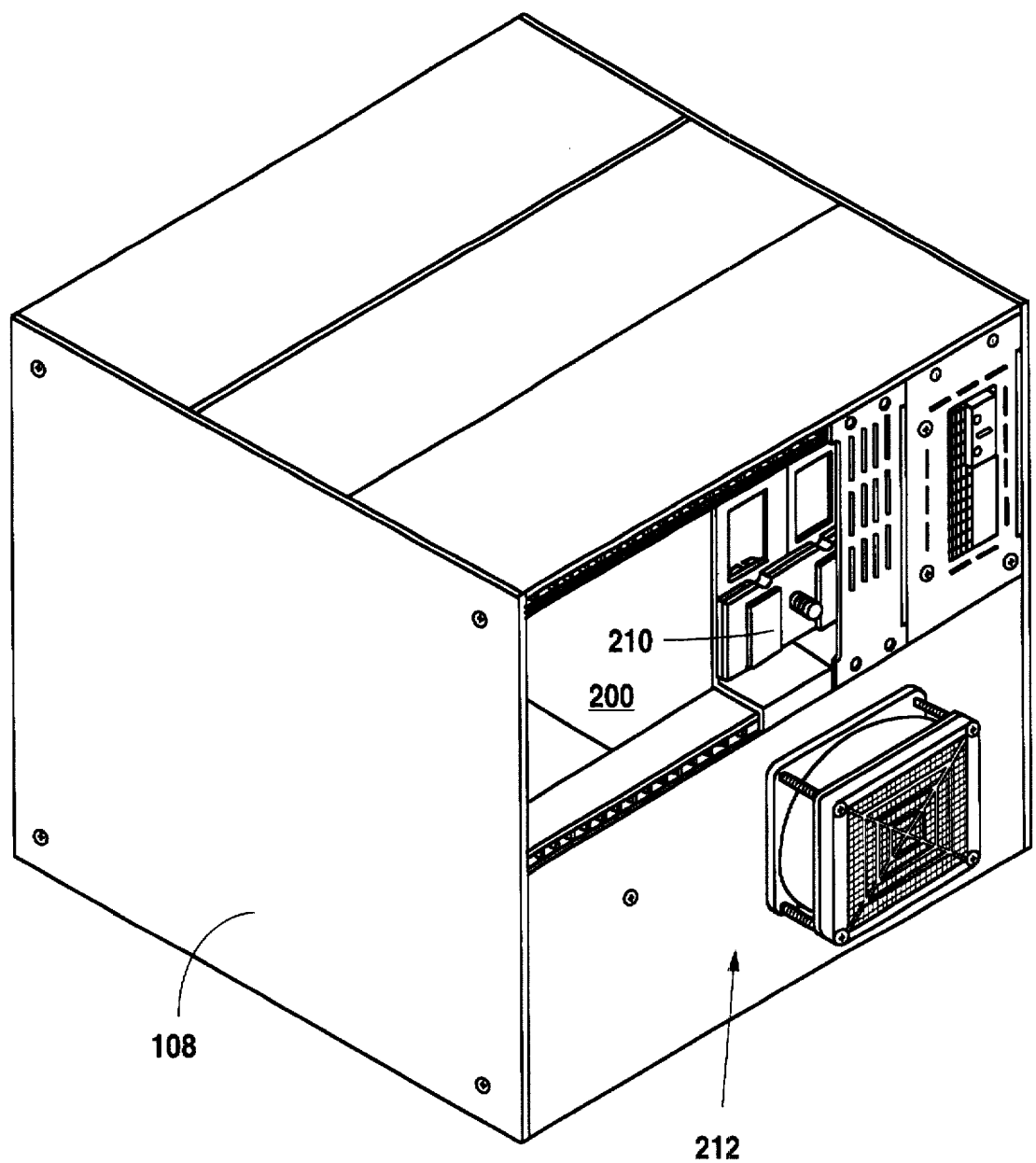
FIG. 2 is a perspective diagram of an SCXI chassis incorporating the present invention.

Referring now to FIG. 2, a more detailed diagram is shown of the backside of the SCXI chassis 108. At least one SCXI module 200 is shown plugged into the chassis 108, where module 200 is a high voltage module having a high voltage bus 210 formed through a high voltage connector (not shown). The module 200 is plugged into a low voltage bus backplane 212, which is built into the SCXI chassis 108. The module 200 is an instrumentation module or switching module or other type of device. In the preferred embodiment, the module 200 is an instrumentation module according to the present invention for measuring high voltage signals multiplexed onto the high voltage bus 210. In particular, other modules may receive high voltage signals on the front end through corresponding terminal blocks 130 as desired, where these high voltage signals are conditioned and multiplexed onto the high voltage bus 210. The module or measuring device 200 measures a high voltage signal, converts the measured signal to a digital value and either performs certain functions depending upon the measured value or otherwise provides a digital value representing the measured signal onto the bus backplane 212, where the digital value is further provided for reporting to a connected computer system 118 as desired. Although the bus backplane 212 is isolated from the high voltage bus 210 through transformers and optocouplers, it is particularly difficult to isolate the low voltage bus backplane 212 from the high voltage bus 210 since a common measurement circuit directly measures the signals on both, as further described below.

Since the instrument module 200 measures signals from the high voltage bus 210 as well as the low voltage bus 212 and since the user is potentially exposed to the low voltage bus 212, a high degree of isolation is required between these buses. Without such electrical isolation, the user could potentially be exposed to the high voltages when contacting the low voltage portions of the system. Traditionally, such low and high voltage measurements were not performed on the same instrument because of the difficulty in isolating the high voltage portion from the low voltage portion on the same instrument.

As an illustration, the UUT 102 could come into contact with a human. An adjacent instrument, or even the same instrument, could be receiving high voltage signals, or otherwise measuring high voltage signals coupled through the high voltage bus 210. If the high voltage bus 210 is not appropriately separated from the low voltage bus 212, then an unintended breakdown of the isolation barrier could potentially expose the human to harmful or even lethal voltage levels. Therefore, instrumentation systems are usually either solely high voltage or low voltage, but have not been hybrid systems designed for measuring a combination of high and low voltages because of the isolation problem. High power relays are known for use in large equipment for industrial applications for separating high voltages from a control panel, which is generally exposed to human operators. However, such relays are very large and bulky and are not rated to instrumentation standards. In particular, such relays are designed to turn on and off large voltages and currents, but are not used to measure signals at an accurate level. Such relays can introduce large voltage errors and therefore are not appropriate for instrument quality measurements. Manually operated switches have been used to provide isolation, but cannot be programatically controlled.

Figure 3:
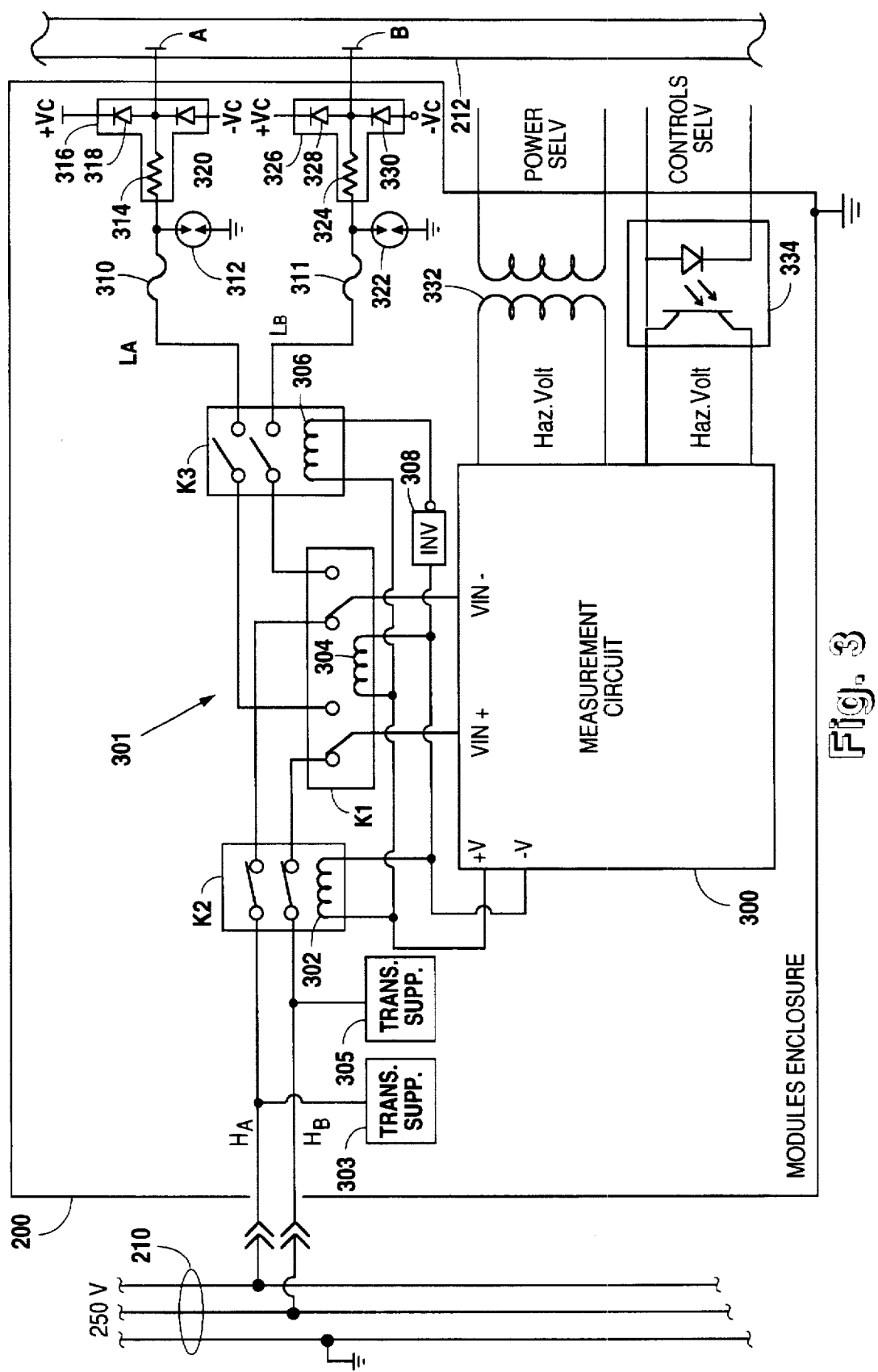
FIG. 3 is a schematic diagram of a portion of an instrumentation module according to the present invention which plugs into the SCXI chassis of FIG. 2.

Referring now to FIG. 3, a schematic diagram is shown of the instrumentation module 200 including isolation circuitry 301 according to the present invention. The instrumentation module 200 is preferably plugged into the chassis 108 and connected to the high voltage bus 210, as well as the low voltage bus 212. The high voltage bus 210 may comprise one or more high voltage channels where high voltage signals are preferably conditioned and multiplexed onto the high voltage bus 210 by other modules for measurement or switching by the instrument module 200. As shown in FIG. 3, the instrument module 200 is connected to two terminals of a 250 V rms signal, which is considered hazardous and not acceptable for human or animal contact. Two of the terminals are sensed through signals $H_A$ and $H_B$ and provided to corresponding contacts of a two-Form-A relay referred to as K2. The K2 relay may also be a two-Form-C relay.

As mentioned above, the module 200 is preferably for instrumentation or switching functions. The module 200 includes a measurement circuit 300. In another embodiment where the module 200 performs switching functions, the circuit 300 is a signal switching circuit. In the preferred embodiment, the circuit 300 is a measurement circuit.

In the preferred embodiment, transient suppressers 303 and 305 are coupled to the $H_A$, $H_B$ signals, respectively, for removing high voltage spikes appearing on the input signal to protect the remaining components within the module or instrument 200, including measurement circuit 300. The relay K2 includes a relay coil 302, which is activated by the measurement circuit 300 through output signals V+ and V−. In particular, the measurement circuit 300 asserts a current through the coil 302 for closing the dual switches within the relay K2, so that the $H_A$ and $H_B$ signals are provided to corresponding contacts of a two-form-C relay K1. The measurement circuit 300 also asserts current through the +V and −V signals to activate a coil 304 within the relay K1 to further connect the $H_A$ and $H_B$ signal to VIN− and VIN+ inputs of the measurement circuit 300. In this manner, when the coils 302, 304 of the relays K2, K1, respectively, are activated, the measurement circuit 300 is connected to the high voltage bus 210 for measuring a high voltage signal.

The +V signal is provided to one end of another coil 306 within two-form-A relay K3, where the other side of the coil 306 is connected to the output of an inverter circuit 308 receiving the −V signal at its input. The inverter 308 serves to deactivate the coil 306 when the coil 302 is activated, and vice-versa, so that the relays K2 and K3 are mutually exclusive. Thus, when the coils 302 and 304 are deactivated, the coil 306 is activated to connect the VIN+ and VIN− inputs of the measurement circuit 300 to corresponding low voltage signals $L_A$ and $L_B$, which are signals measured from corresponding inputs of the low voltage bus 212. The coils 302, 304 and 306 coupled to the measurement circuit 300 are sufficiently isolated from the respective relay contacts to meet the double insulation standard. However, the respective contacts are isolated only to the basic insulation standard.

It is noted that several variations are possible for the relay configuration. For example, in a preferred embodiment, relay K2 is normally open while relay K3 is normally closed, where relay K1 couples the measurement circuit 300 to the relay K3 while de-activated. In this preferred embodiment, the inverter 308 is not necessary and is preferably not included. In this manner, the relays K1, K3 couple the measurement circuit 300 to the low voltage side while none of the relays are activated. When all relays are activated, the relays K2 and K1 couple the high voltage bus 210 to the measurement circuit 300. In either of these embodiments, the relays K2 and K3 are mutually exclusive so that one provides isolation while the other provides connection and vice versa.

In another embodiment, the relay coils K1, K2, and K3 are in series and are driven by the same control line. In this embodiment, the second relay K2 is a form-A and the K3 relay is a form B, or vice versa.

The LA signal is connected to one end of a fuse 310. The other end of the fuse 310 is connected to one end of a resistor 314 within a clamp circuit 316 and to the input of a spark gap 312, having its other terminal connected to ground. The other end of the resistor 314 is connected to a bus line A within the low voltage bus 212. The clamp circuit 316 includes a first diode 318 having its anode connected to the A signal and its cathode connected to a clamp voltage $+V_c$, and further includes a diode 320, having its anode connected to a clamp voltage $-V_c$, and its cathode connected to the A signal. The $+V_c$ and $-V_c$ signals could have any magnitude within the safe voltage level of 30 Vrms and 42.4 peak or 60 VDC, such as 15 V, 18.5 V or 20 V, etc. The clamp circuit 316 serves to prevent the A signal from increasing 0.7 V above or below the $V_c$ voltage, where 0.7 volts is the forward drop of either diode 318, 320. In an alternative embodiment, the anode of the diode 320 could be connected to ground to clamp the A signal from going below $-0.7$ V or otherwise the forward drop of the diode 320. Alternatively, zener diodes or metal oxide varistors could be used as clamps.

In a similar manner, the $L_B$ signal from the other contact of the relay K3 is connected to one end of another series fuse 311. The other end of the series fuse 311 is connected to one terminal of a spark gap 322 and to one end of a resistor 324 of a clamp circuit 324. The other terminal of the spark gap 322 is connected to ground, and the other end of the resistor 324 is connected to a signal B of the low voltage bus 212. Again, the clamp circuit 326 includes two diodes 328 and 330 connected between the $+V_c$ signal and $-V_c$ signal in a similar manner as the clamp circuit 316 for clamping the B signal between $+/-(0.7+V_c)$. Also, the anode of the diode 330 could be connected to ground to clamp the B signal essentially to ground. The clamp circuit 326 prevents the B signal from increasing 0.7 V above $V_c$ (or below $-V_c$).

The spark gaps 312, 322 are preferably high integrity components which provide a direct current path to chassis ground in the event of high voltage appearing on the $L_A$, $L_B$ signals. In the preferred embodiment, the spark gaps 312, 322 are rated at an intermediate voltage level of 70 volts, sufficient to protect the clamp circuits 316, 326, respectively, and are capable of handling very high levels of current. The spark gaps 312, 322 reset automatically when the high voltage condition is removed. The spark gaps 312, 322 may be implemented in a variety of ways, such as using gas tubes or the like, or omitted in some cases.

The measurement circuit 300 is connected to the low voltage bus backplane 212. The low voltage bus backplane 212 provides a power signal through a transformer 332 to is provide power to the measurement circuit 300. Furthermore, an external control circuit, such as the computer system 118, asserts control signals through an optocoupler 334 for asserting control signals to the measurement circuit 300. The transformer 332 and the optocoupler 334 serve to isolate the measurement circuit 300 from the low voltage bus backplane 212. The transformer 332 preferably meets the double insulation standard with a separation of at least 3.3 mm between the primary and secondary coils to thereby isolate the measurement circuit 300 from the low voltage bus backplane 212. Furthermore, the optocoupler 334 also meets the double insulation requirements for isolating the measurement circuit 300 from the low voltage bus backplane 212. It is noted, however, that transformers and optocouplers are not appropriate for taking instrument quality measurements requiring high accuracy, since the signal would have to be modulated at the input and de-modulated at the output, thereby reducing accuracy, losing linearity and also introducing significant noise levels. Therefore, the relays K1, K2 and K3 allow direct connection and are preferable for taking low and high voltage and high accuracy measurements of signals appearing on the high voltage bus 210, as well as the low voltage bus 212.

It is noted that an instrument may include multiple levels of relays for multiplexing a plurality of high and low voltage signals to the measurement circuit 300. For example, the module or instrument 200 may receive two pairs of high voltage signals $H_{A1}$, $H_{B1}$ and $H_{A2}$, $H_{B2}$ as well as two pairs of low voltage signals $L_{A1}$, $L_{B1}$ and $L_{A2}$, $L_{B2}$ which are all multiplexed to be measured by the measurement circuit 300. The computer system 118 may control the desired switching by sending appropriate command signals through the interface bus 116 and through the bus backplane 212, which signals are provided to control circuitry (not shown) within the measurement circuit 300 through the optocoupler 334. Further, several similar measurement circuits 300 could be provided in one module. Nonetheless, all such embodiments and variations include the isolation circuitry 301 shown in FIG. 3, which is illustrative of the present invention.

In operation, the measurement circuit 300 activates the coils 302, 304, thereby deactivating coil 306, for taking differential measurements on the high voltage bus 210. The measurement circuit 300 deactivates coils 302 and 304 and activates coil 306 for coupling its inputs to the A and B signals for taking differential measurements of the low voltage bus 212. In this manner, the $H_A$ and $H_B$ high voltage signals are always separated from the $L_A$, $L_B$ low voltage signals through at least two basic insulation gaps through the relays K1 and K2, or the relays K2 and K3 during normal operation. In particular, the respective contacts of all of the relays K1, K2 and K3 meet the basic insulation requirements by being recognized by a safety agency as capable of safely switching 250 Vrms and by meeting the required high potential test. In this manner, the relays K1, K2 and K3 are sufficient to meet the electrical isolation requirements, such as IEC 1010-1.

However, it is known that relays sometimes fail. Thus, if any one of the relays K1, K2 or K3 should fail so that its contacts fuse together, the high voltage bus 210 and the low voltage bus 104 are only separated by a single basic insulation gap of 1350 V. It is further noted that an operator may not be aware of the situation, so that this condition may exist for a significant period of time. Thus, in the event of a relay failure, the relays K1, K2 and K3 alone would no longer meet the desired electrical isolation.

Should a second relay fail, such that the high voltage bus 210 is directly connected to the low voltage bus 104, the spark gaps 312, 322 close, thereby limiting the $L_A$ and $L_B$ signals to a medium voltage level, which is preferably 70 V. Furthermore, the clamp circuits 316 and 326 limit the maximum voltage level appearing on the A and B signals to the magnitude of $V_c$ plus the forward drop across a diode, where the total is less than 30 Vrms and 42.4 Vpeak or 60

VDC. Of course, most of the voltage drop appears across the resistors 314, 324. It is noted that the spark gaps 312 and 322 alone, without the clamp circuits 316, 326, might still result in hazardous voltage levels on the low voltage bus 212, being above 30 Vrms and 42.4 Vpeak or 60 VDC rms. Thus, the clamp circuits 316, 326 including the resistors 314, 324 further reduce the voltage down to safe levels. The clamp circuits 316, 326 would potentially fail in the face of the higher voltage levels of the high voltage bus 210 without the spark gaps 312, 322. In this manner, the spark gaps 312, 322 operate to protect the clamp circuits 316, 326, respectively, which, in turn, reduce the hazardous voltage levels appearing on the $L_A$ and $L_B$ signals to the non-hazardous voltage levels below 30 Vrms and 42.4 Vpeak or 60 VDC. Thus, the spark gaps 312, 322 and the clamp circuits 316, 326 establish indirect bonding to earth ground or to safe voltage levels, which, when combined with a failure of a single relay of relays K1, K2 and K3, meets the published electrical safety isolation requirements.

If the high voltage appearing on the $L_A$ and $L_B$ signals is present for a significant period of time, a significant current flows through the fuses 310, 311, causing them to blow. In this manner, the fuses 310, 311 blow and open circuit the electrical path between the relay K3 and the low voltage bus 212, thereby establishing at least a basic insulation gap between the high voltages on the $L_A$ and $L_B$ signals and the low voltage bus 212. In this manner, the basic insulation gap of the blown fuses 310, 311 combined with the indirect bonding to earth ground to the spark gaps 312, 322 and the clamp circuits 316, 326 serve to meet the required electrical isolation standards.

It is noted that it is possible to increase the value of the resistors 314, 324 to further reduce the power dissipation in the clamp circuits 316, 326. However, this is not considered a desirable solution since raising these resistance values would adversely affect the accuracy of measurements during normal operation. Thus, the resistors 314, 324 are kept as low as possible to maintain high accuracy while also allowing voltage drop and current limiting between the spark gaps and the clamp circuits.

In one embodiment of the invention, the coils 302, 304 and 306 are all in series.

Thus, if one of the coils breaks down, no path remains for control signals, and thus the relay associated with the broken coil remains in its current state.

It is now appreciated that an isolation circuit according to the present invention enables an instrument to measure both low and high voltages within the same instrument chassis to a sufficient degree of accuracy, while maintaining the necessary levels of isolation according to published standards. In particular, a central relay and two mutually exclusive relays are each rated at the basic insulation level, thereby meeting the double insulation standard during normal operation. Should any one or more of the relays fail and cause a closed circuit path between the high voltage bus and the low voltage side, spark gaps are provided on both terminals to reduce the voltage to an intermediate voltage level. Clamp circuits connected directly to the inputs appearing on the low voltage bus further limit the voltage of the spark gaps to safe, non-hazardous levels, thereby protecting a user of the instrumentation system. Thus, the spark gaps serve to reduce the voltage to a low enough level that the clamp circuits are able to handle, which further limit the voltage to non-hazardous levels. Furthermore, in-series fuses are provided to protect the spark gaps 312, 322. This establishes a further insulation gap to separate or otherwise isolate the user from the hazardous high voltage levels.

Although the system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. An isolation system, comprising:
    a low voltage bus;
    a high voltage bus;
    a measurement circuit for measuring signals on said high voltage bus and said low voltage bus;
    a first relay coupled to the measurement circuit for switching between the low and high voltage buses, said first relay having isolation between coil to contact providing double insulation and isolation between contact to contact meeting basic insulation;
    a second relay coupled between said first relay and said high voltage bus for coupling the measurement circuit to at least one high voltage signal line on the high voltage bus, said second relay having isolation between coil to contact providing double insulation and isolation between contact to contact providing basic insulation;
    a third relay coupled between said first relay and said low voltage bus for coupling the measurement circuit to at least one low voltage signal line on the low voltage bus, said third relay having isolation between coil to contact providing double insulation and isolation between contact to contact providing basic insulation, said third relay having a state which is opposite of said second relay;
    wherein when said first relay is switched to the low voltage bus, and the third relay is closed, the second relay is open, and the open contact of said first relay and the open contact of said second relay provide double insulation; and
    wherein when said first relay is switched to the high voltage bus, and the second relay is closed, the third relay is open, and the open contact of said first relay and the open contact of said third relay provide double insulation.

2. The isolation system of claim 1, wherein the measurement circuit activates respective coils of said first, second and third relays for switching between the high voltage bus and the low voltage bus.

3. The isolation system of claim 1, wherein said second relay couples the measurement circuit to the high voltage bus while said third relay isolates the measurement circuit from the low voltage bus and wherein said second relay isolates the measurement circuit from the high voltage bus while said third relay couples the measurement circuit to the low voltage bus.

4. The isolation system of claim 3, further comprising:
    an inverter coupled between the respective coils of said second and third relays, wherein said inverter achieves mutually-exclusive states between said second and third relays.

5. The isolation system of claim 1, wherein
    said first relay includes at least one form-C switch having respective contacts coupled to said second and third relays; and
    said second and third relays including single-pole, single throw switches.

6. The isolation system of claim 1, further comprising:
a clamp circuit coupled to said low voltage signal line of the low voltage bus for limiting maximum voltage applied to said low voltage signal line to below a hazardous voltage level; and
a spark gap coupled between said clamp circuit and ground for limiting the maximum voltage applied to said clamp circuit to an intermediate voltage level.

7. The isolation system of claim 6, further comprising:
a means for providing a clamp voltage having a voltage level below said hazardous voltage level;
wherein each of said clamp circuit comprises:
a first rectifier coupled between said low voltage signal line and said clamp voltage;
a second rectifier coupled between said low voltage signal line and ground; and
a resistive element coupled between said third relay and said low voltage signal line.

8. The isolation system of claim 7, wherein the means for providing a clamp voltage provides positive and negative clamp voltages having approximately equal magnitudes, and wherein said second rectifier is coupled between said low voltage signal line and the negative clamp voltage.

9. The isolation system of claim 6, further comprising a fuse coupled in series between said third relay and said clamp circuit.

10. The isolation system of claim 9, wherein said fuse blows if said spark gap and/or clamp is exposed to a high voltage level for a predetermined period of time causing significant current through said fuse.

11. The isolation system of claim 1, wherein the high voltage bus includes high voltage signals.

12. The isolation system of claim 6, wherein said hazardous voltage level is 30 Vrms and 42.4 Vpeak or 60 VDC.

13. An instrumentation system for measuring signals on a high voltage bus and a low voltage bus, comprising:
a measurement system including differential inputs for performing differential measurements of signals on the high and low voltage buses;
a first relay having dual contacts for coupling to said differential inputs of said measurement system and first and second sets of contacts for switching between the low and high voltage buses, said first relay having contact to contact isolation meeting basic insulation;
a second relay coupled to said first relay, where said second relay includes dual sets of contacts for coupling said first set of contacts of said first relay to differential signals of the high voltage bus, said second relay having contact to contact isolation between said dual sets of contacts meeting basic insulation;
a third relay coupled to said first relay, where said third relay includes dual sets of contacts for coupling said second set of contacts of said first relay to differential signals of the low voltage bus, said third relay having contact to contact isolation between said dual sets of contacts meeting basic insulation;
wherein when said first relay is switched to the low voltage bus, and the third relay is closed, the second relay is open, and the open contact of said first relay and the open contact of said second relay provide double insulation; and
wherein when said first relay is switched to the high voltage bus, and the second relay is closed, the third relay is open, and the open contact of said first relay and the open contact of said third relay provide double insulation.

14. The instrumentation system of claim 13, wherein the measurement system activates respective coils of said first, second and third relays for switching between the high voltage bus and the low voltage bus.

15. The instrumentation system of claim 13, wherein said second relay couples the measurement system to the high voltage bus while said third relay isolates the measurement system from the low voltage bus and wherein said second relay isolates the measurement system from the high voltage bus while said third relay couples the measurement system to the low voltage bus.

16. The instrumentation system of claim 13, further comprising:
an inverter coupled between the respective coils of said second and third relays, wherein said inverter achieves mutually-exclusive states between said second and third relays.

17. The instrumentation system of claim 13, further comprising:
a clamp circuit coupled between said third relay and said differential signals of the low voltage bus for limiting the maximum voltage applied to said low voltage bus differential signals to a non-hazardous voltage level; and
a spark gap circuit coupled between said dual sets of contacts of said third relay and ground for limiting the maximum voltage applied to said clamp circuit to an intermediate voltage level.

18. The instrumentation system of claim 17, wherein said clamp circuit comprises:
a first clamp coupled to a first signal of said differential signals of the low voltage bus; and
a second clamp coupled to a second signal of said differential signals of the low voltage bus.

19. The instrumentation system of claim 18, wherein said first and second clamps each comprise:
a series resistive element coupled between a respective contact of said third relay and one of said differential signals of the low voltage bus;
a first rectifier coupled between said one of said differential signals and a first clamp voltage; and
a second rectifier coupled between said one of said differential signals and a second clamp voltage;
wherein said first and second clamp voltages are non-hazardous.

20. The instrumentation system of claim 19, wherein said first and second clamp voltages have opposite polarities and approximately equal magnitudes at or below said non-hazardous voltage level.

21. The instrumentation system of claim 19, wherein said second clamp voltage is ground.

22. The instrumentation system of claim 18, further comprising:
a first fuse coupled in series between a first contact of said third relay and said first clamp; and
a second fuse coupled in series between a second contact of said third relay and said second clamp.

23. The instrumentation system of claim 17, wherein said spark gap circuit comprises:
a first spark gap element coupled between a first contact of said third relay and ground; and
a second spark gap element coupled between a second contact of said third relay and ground.

24. The instrumentation system of claim 13, wherein said measurement system operates said second and third relays in a mutually exclusive manner, wherein said second relay provides connection while said third relay provides isolation and wherein said third relay provides connection while said second relay provides isolation.

25. An isolation system for a switching system, comprising:
   a low voltage bus;
   a high voltage bus;
   a switching circuit for switching signals on said high voltage bus and said low voltage bus;
   a first relay coupled to the switching circuit for switching between the low and high voltage buses, said first relay having isolation between coil to contact providing double insulation and isolation between contact to contact meeting basic insulation;
   a second relay coupled between said first relay and said high voltage bus for coupling the switching circuit to at least one high voltage signal line on the high voltage bus, said second relay having isolation between coil to contact providing double insulation and isolation between contact to contact providing basic insulation;
   a third relay coupled between said first relay and said low voltage bus for coupling the switching circuit to at least one low voltage signal line on the low voltage bus, said third relay having isolation between coil to contact providing double insulation and isolation between contact to contact providing basic insulation, said third relay having a state which is opposite of said second relay;
   wherein when said first relay is switched to the low voltage bus, and the third relay is closed, the second relay is open, and the open contact of said first relay and the open contact of said second relay provide double insulation; and
   wherein when said first relay is switched to the high voltage bus, and the second relay is closed, the third relay is open, and the open contact of said first relay and the open contact of said third relay provide double insulation.

26. The isolation system of claim 25, wherein the switching circuit activates respective coils of said first, second and third relays for switching between the high voltage bus and the low voltage bus.

27. The isolation system of claim 25, wherein said second relay couples the switching circuit to the high voltage bus while said third relay isolates the switching circuit from the low voltage bus and wherein said second relay isolates the switching circuit from the high voltage bus while said third relay couples the switching circuit to the low voltage bus.

28. The isolation system of claim 27, further comprising:
   an inverter coupled between the respective coils of said second and third relays, wherein said inverter achieves mutually-exclusive states between said second and third relays.

29. The isolation system of claim 25, wherein
   said first relay includes at least one form-C switch having respective contacts coupled to said second and third relays; and
   said second and third relays including single-pole, single throw switches.

30. The isolation system of claim 25, further comprising:
   a clamp circuit coupled to said low voltage signal line of the low voltage bus for limiting maximum voltage applied to said low voltage signal line to below a hazardous voltage level; and a spark gap coupled between said clamp circuit and ground for limiting the maximum voltage applied to said clamp circuit to an intermediate voltage level.

31. An instrumentation system for measuring signals on a high voltage bus and a low voltage bus, comprising:
   a measurement system including four wires and which performs four wire measurements on the high and low voltage buses;
   a first relay having four contacts for coupling to said four wires of said measurement system and first and second sets of contacts for switching between the low and high voltage buses, said first relay having contact to contact isolation meeting basic insulation;
   a second relay coupled to said first relay, where said second relay includes four contacts for coupling said first set of contacts of said first relay to differential signals of the high voltage bus, said second relay having contact to contact isolation between said four contacts meeting basic insulation;
   a third relay coupled to said first relay, where said third relay includes four contacts for coupling said second set of contacts of said first relay to differential signals of is the low voltage bus, said third relay having contact to contact isolation between said four contacts meeting basic insulation;
   wherein when said first relay is switched to the low voltage bus, and the third relay is closed, the second relay is open, and the open contact of said first relay and the open contact of said second relay provide double insulation; and
   wherein when said first relay is switched to the high voltage bus, and the second relay is closed, the third relay is open, and the open contact of said first relay and the open contact of said third relay provide double insulation.

32. The instrumentation system of claim 31, wherein the measurement system activates respective coils of said first, second and third relays for switching between the high voltage bus and the low voltage bus.

33. An isolation system, comprising:
   a low voltage bus;
   a high voltage bus;
   a measurement circuit for measuring signals on said low voltage bus and said high voltage bus;
   a first relay coupled to said measurement circuit, wherein said first relay includes a first coil and a dual set of contacts, wherein said first relay is used to switch between said low voltage bus and said high voltage bus, wherein said first relay has isolation between contacts within said first set of contacts to provide basic insulation, and wherein said first relay has isolation between said first coil and said contacts within said first set of contacts to provide double insulation;
   a second relay coupled to said first relay and to said high voltage bus, wherein said second relay includes a second coil and a second set of contacts, wherein said second relay has isolation between contacts within said second set of contacts to provide basic insulation, and wherein said second relay has isolation between said second coil and said contacts within said second set of contacts to provide double insulation;
   a third relay coupled to said first relay and to said low voltage bus, wherein said third relay includes a third coil and a third set of contacts, wherein said third relay has isolation between contacts within said third set of contacts to provide basic insulation, and wherein said third relay has isolation between said third coil and said contacts within said third set of contacts to provide double insulation;

wherein when said first relay is switched to said low voltage bus and said third relay is closed, said second relay is open and one set of said dual set of contacts of said first relay is open to provide double insulation;

wherein when said first relay is switched to said high voltage bus and said second relay is closed, said third relay is open and one set of said dual set of contacts of said first relay is open to provide double insulation.

34. The isolation system of claim 33, wherein said measurement circuit provides control signals to said first coil, said second coil, and said third coil for switching between said high voltage bus and said low voltage bus.

35. The isolation system of claim 33, wherein said second relay couples said measurement circuit to said high voltage bus while said third relay isolates said measurement circuit from the low voltage bus, and wherein said second relay isolates said measurement circuit from said high voltage bus while said third relay couples said measurement circuit to said low voltage bus.

36. The isolation system of claim 35, further comprising:

an inverter coupled between said second coil and said third coil, wherein said inverter achieves mutually-exclusive states between said second relay and said third relay.

37. The isolation system of claim 33, further comprising:

protection circuitry coupled to said third relay and said low voltage bus to prevent excess voltages or currents from appearing on said low voltage bus.

38. The isolation system of claim 37, wherein said protection circuitry comprises:

a clamp circuit coupled to said low voltage bus for limiting the maximum voltage applied to said low voltage bus to below a hazardous voltage level; and a spark gap coupled between said clamp circuit and ground for limiting the maximum voltage applied to said clamp circuit to an intermediate voltage level.

39. The isolation system of claim 38, further comprising:

a means for providing a clamp voltage having a voltage level below said hazardous voltage level; and wherein said clamp circuit comprises:

a first rectifier coupled between said low voltage bus and said clamp voltage;

a second rectifier coupled between said low voltage bus and ground; and a resistive element coupled between said third relay and said low voltage bus.

40. The isolation system of claim 38, further comprising a fuse coupled in series between said third relay and said clamp circuit.

41. The isolation system of claim 40, wherein said fuse blows if said spark gap or said clamp circuit is exposed to a high voltage level for a predetermined period of time.

42. The isolation system of claim 38, wherein said hazardous voltage level is approximately 30 Vrms and 42.4 V peak or 60 VDC.

* * * * *